April 8, 1930. E. SCHWEIZER 1,753,628
MACHINE FOR MAKING SPOOLS OR BOBBINS
Filed July 7, 1926
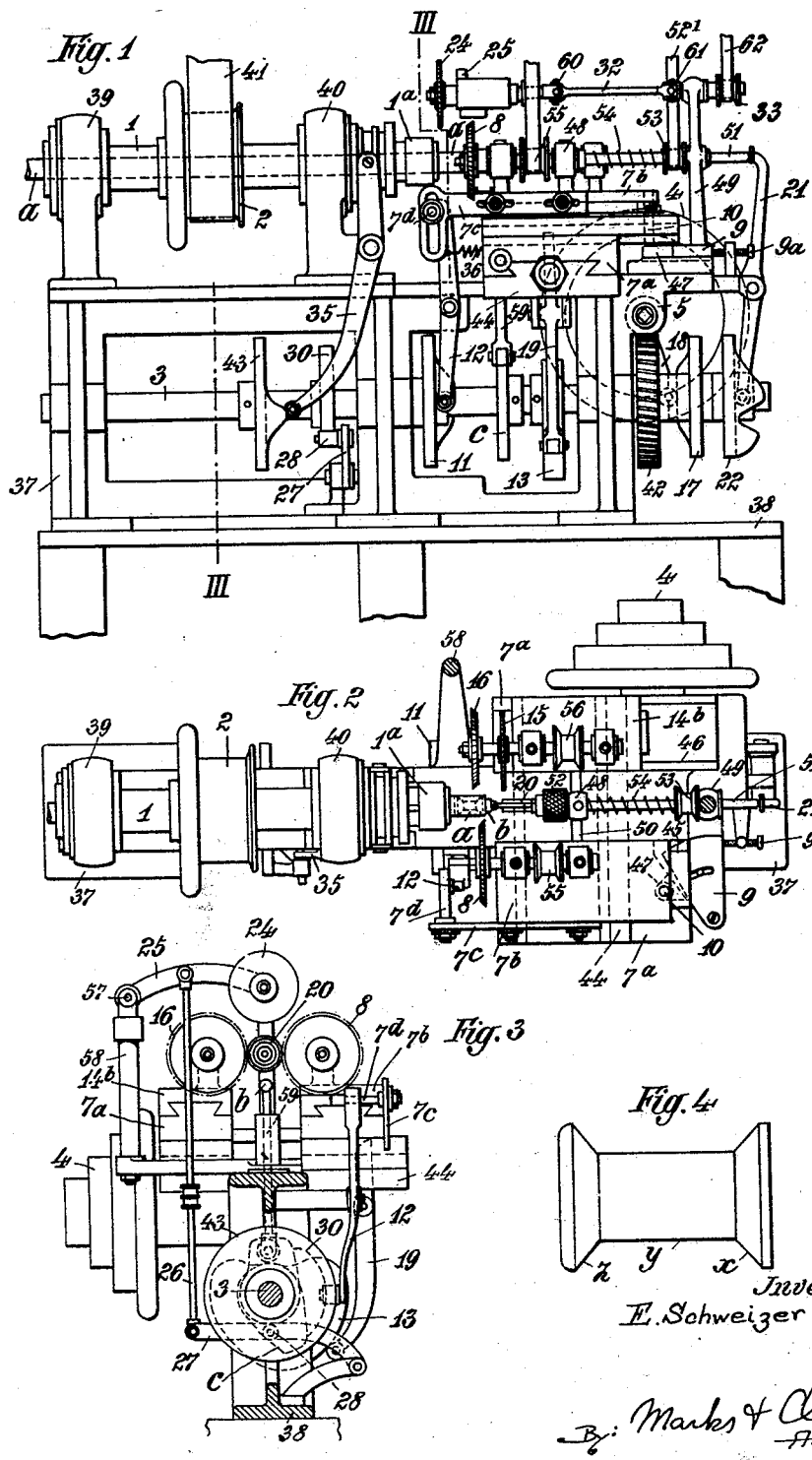
Inventor:
E. Schweizer
By: Marks & Clerk
Attys.

Patented Apr. 8, 1930

1,753,628

UNITED STATES PATENT OFFICE

ERNST SCHWEIZER, OF BASEL, SWITZERLAND

MACHINE FOR MAKING SPOOLS OR BOBBINS

Application filed July 7, 1926, Serial No. 121,020, and in Switzerland July 11, 1925.

This invention relates to a machine for the manufacture of wooden spools from wooden rods of the kind in which the rod which is held in a rotataing hollow shaft is drilled by a drilling device and a rotatable tool is fed forward to the work automatically in a positive sequence for the purpose of machining the work and severing it from the rod.

According to the known machines of this type, the tools for making the profile of the spool consist of profile cutters, which for the purpose of making the profile only approach the axis of the work piece or blank but do not make any further movement. It has however been found that the firmness of the material, of which such spools consist, can not withstand the pressure of the profile cutters, which acts on the entire length of the work piece or blank and that during the working or machining operation, the spool frequently breaks at its clamped end. If the drill for making the central bore of the spool also serves for centering the work piece or blank when the profile is made, the drill may easily break because it is also subjected to flexure.

According to the invention, these disadvantages or drawbacks are obviated in that the spool profile is made by a narrow cutter disc, the thickness of which amounts to only a slight fraction of the length of the spool and which cutter disc, when making the spool profile, is first guided obliquely to the axis of the spool in order to make the flange, then moves parallel to the axis of the spool in order to form the spool body, whereupon it is returned again obliquely to the axis of the spool in order to make the second flange. The narrow cutter disc exerts on the workpiece or blank much less pressure than the known profile cutters, which simultaneously produce the entire profile. Owing to constant movement of the profile cutter parallel to the axis of the workpiece or blank, a large amount of the exerted pressure forms a component which extends parallel to the axis of the workpiece or blank and the latter is not subjected to flexure but only to nondetrimental pressure in the direction of the fiber. The pressure exerted by a cutter disc, according to the invention, transversely to the axis of the workpiece or blank, is therefore considerably less than would correspond to the reduction of the ratio between the spool length and the tool width.

The movement or displacement of the cutter disc is preferably effected by mounting the cutter disc on slides and controlling the same in positive relation and sequence by a number of cam discs mounted on the same shaft so that the slide which constantly moves parallel to the axis of the workpiece or blank simultaneously approaches the axis of the workpiece or blank at the beginning of the operation and is again withdrawn therefrom at the end of the operation in order to make the inclined flanges.

The invention will now be described in detail with reference to the accompanying drawings, in which:—

Figure 1 shows a machine in elevation, while

Figure 2 is a corresponding plan, and

Figure 3 an end elevation partly in section III—III, Fig. 1.

Figure 4 shows a spool manufactured on the machine.

Referring now to the drawings, and first to Figs. 1 to 3, 37 is the frame of the machine, 38 is its foundation plate, 1 is a hollow feed shaft for the reception of the rod $a$, 39, 40 are bearings for the hollow shaft, 2 is a pulley on the hollow shaft, and 41 is a belt on the pulley. $1^a$ is a chuck at the end of the hollow shaft by which the rod $a$ is clamped while being machined, as will be described. 3 is the main shaft which is carried in suitable bearings in the frame of the machine, 43, 30, 11, $c$, 13, 17, and 22 are cam plates on the shaft, 42 is a worm wheel on the shaft, 5 is a worm meshing with the wheel 42, and 4 is a step pulley on the shaft of the worm.

35 is a rocking lever by which the chuck $1^a$ is controlled from the cam 43.

44 is a dove-tailed guide extending across the frame 37 near its rear end, $7^a$ is a carriage on the guide 44, 19 is a rocking lever extending from cam 13, the edge of which is partly concentric, to the carriage $7^a$ so that the carriage is moved while the lever 19 is on the cammed part of the plate 13, and 7ᵇ and 14ᵇ are tool slides fitted to move along guides 45 and 46 which are formed on the carriage 7ᵃ in parallel relation with the axis of the machine. 7ᶜ is a bar secured to the outer edge of the slide 7ᵇ, with a slotted eye at one end, 12 is a rocking lever cooperating with cam plate 11, and 7ᵈ is a pin at the end of the lever which engages the eye of the bar 7ᶜ. 36 is a pull-back spring engaging the lever 12. 10 is a pin at the rear end of the slide 7ᵇ, which extends through a slot in the carriage 7ᵃ, 47 is a shoe fitted to the lower end of the pin 10, 9 is a former which is fulcrumed on the frame 37 and is adapted to be engaged by the shoe 47 at its edge, and 9ᵃ is a screw for adjusting the former 9. 18 is a rocking lever by which the slide 14ᵇ and the cam 17 are operatively connected, the lever being only partly visible in Fig. 1.

51 is a drill rod which is mounted to rotate and to slide in bearings 48 and 49 which extend upwards from the frame 37, the carriage 7ᵃ being slotted at 50 for the accommodation of the front bearing 48; 52 is a chuck on the free end of the rod, and 20 is a drill in the chuck. Rotation is imparted to the drill rod by a belt 52' on a pulley 53. The drill rod rotates in opposite direction to that in which the hollow shaft 1 rotates. 21 is a rocking lever operatively connected with the cam plate 22 and abutting on the rod 51 with its upper end so as to displace said rod against the action of a spring 54.

8, 15, and 16 are milling cutters mounted to rotate on the slides 7ᵃ and 14ᵇ, respectively, with pulleys 55 and 56 on the respective cutter shafts. 24 is a cutting-off tool at the end of a rocking lever 25 which is fulcrumed at the upper end of an upright 58 at 57, 26 is a link, and 27 is a lever through which the lever 25 is rocked from the cam plate 30.

59 is a rod, with a stop $b$ at its upper end for arresting the rod $a$ while the spool is being tooled. The rod 59 cooperates with the cam plate $c$.

Rotation is imparted to the cutting-off tool 24 by a belt 62 on a pulley 33 at the end of a shaft which is mounted to rotate in an extension of the bearing 49, 61 is a ball-joint at the inner end of the shaft, 60 is a ball-joint at the end of the shaft on which the tool 24 is secured, and 32 is a shaft connecting the two ball joints.

The method of working of the machine is as follows:

After the rod $a$ is pushed up to the stop $b$, the clamping chuck 1ᵃ controlled by a controlling lever 35 comes into operation and clamps the work fast. Thereupon the stop $b$, under the action of the cam plate $c$, is drawn downwards and the rotating drill 20 produces the central hole in the spool by being forced a number of times into the rod. Thereupon, the slides 7ᵃ and 7ᵇ with the milling cutter 8 are guided up to the work, the slide 7ᵇ being shifted in an oblique direction by means of the parts 9, 10, during the forward feed of the slide 7ᵃ, so that the milling cutter 8 mills out the oblique surface $x$ at one head end of the spool body. Then while the slide 7ᵃ remains stationary for some time in the advanced position, the slide 7ᵇ is shifted, together with the milling cutter 8, by the action of the lever 12, along the spool body, for the purpose of milling out the cylindrical spool trunk $y$. While the longitudinal displacement of the slide 7ᵇ still continues, the slide 7ᵃ begins its return movement, whereby the milling cutter 8 moves along an oblique path and mills the inclined surface $z$ at the other head end of the spool body, whereupon the lever 12 is relieved of the pressure of the cam plate 11 and under the action of the spring 36 returns the slide 7ᵇ idly towards the initial position. During the return movement of the lower slide 7ᵃ and the milling cutter 8, i. e. during the milling of the surface $z$, the upper slide 14ᵇ resting on the common lower slide 7ᵃ, together with the two milling cutters 15, 16 is moved towards the work. As soon as the slide 7ᵇ, after the surface $z$ has been finished, moves rearwardly still further, the milling cutters 15, 16, under the action of the cam plate 17 begin to mill away at the peripheries of the head ends of the spool body, until finally they are retracted by shifting the slide 14ᵇ back into the inoperative position.

As a last step the cam plate 30 comes into operation and by means of the levers and link 27, 26, 25 moves the milling cutter 24 downwards for the purpose of separating the finished spool from the rod $a$.

By suitably shaping the cam plate 30, the continuous movement of the cutter 24 towards the axis of the work can be retarded, so that fracture or displacement of the work from its initial position under the action of the milling cutter pressure is avoided.

Having now particularly described and ascertained the nature of my said invention and in what manner the same is to be performed, I declare that what I claim is:

1. A machine for making wooden spools from a rod, having a rotating hollow shaft, means for clamping a rod therein, a rotating drill for drilling said rod, a narrow disc cutter, whereby only a fraction of the surface to be worked upon comes in contact with the cutter, and means for guiding said cutter both obliquely and parallel to the axis of said workpiece.

2. A machine for making wooden spools from a rod, having a rotating hollow shaft, means for clamping a rod therein, a rotating drill for drilling said rod, a carriage, means for moving said carriage across said machine, a slide on said carriage, a rotary narrow disc cutter on said slide, and means for moving said slide at an angle to, and in parallel relation with, the axis of said hollow shaft.

3. A machine for making wooden spools from a rod, having a rotating hollow shaft, means for clamping a rod therein, a rotating drill for drilling said rod, a carriage, means for moving said carriage across said machine, slides on said carriage at either side of the axis of said hollow shaft, narrow disc cutters on said slides, means for moving one of said slides at an angle to, and in parallel relation with, the axis of said hollow shaft, and means for moving said other slide in parallel relation with said axis.

4. A machine for making wooden spools from a rod, having a rotating hollow shaft, means for clamping a rod therein, a rotating drill for drilling said rod, a narrow disc cutter whereby only a fraction of the surface to be worked upon comes in contact with the cutter, means for guiding said cutter both obliquely and parallel to the axis of said workpiece, and means for cutting off the finished spool from said rod.

In testimony whereof I affix my signature.

ERNST SCHWEIZER.